United States Patent

Kerdranvat

[11] Patent Number: 5,905,535
[45] Date of Patent: *May 18, 1999

[54] DIFFERENTIAL CODING OF MOTION VECTORS USING THE MEDIAN OF CANDIDATE VECTORS

[75] Inventor: Michel Kerdranvat, Bischoffsheim, France

[73] Assignee: Thomson multimedia S.A., Courbevoie, France

[*] Notice: This patent issued on a continued prosecution application filed under 37 CFR 1.53(d), and is subject to the twenty year patent term provisions of 35 U.S.C. 154(a)(2).

[21] Appl. No.: 08/534,787

[22] Filed: Sep. 27, 1995

[30] Foreign Application Priority Data

Oct. 10, 1994 [FR] France .................. 94 12083

[51] Int. Cl.$^6$ ........................................ H04N 7/32
[52] U.S. Cl. .......................................... 348/416; 348/699
[58] Field of Search ................... 348/699, 416, 348/402, 413, 401, 400, 415, 409, 390, 384; 382/238, 236, 232; H04N 7/137

[56] References Cited

U.S. PATENT DOCUMENTS 5,386,248  1/1995  De Haan et al. ................. 348/699
5,557,341  9/1996  Weiss et al. ...................... 348/699
5,576,765  11/1996  Cheney et al. ................... 348/416

FOREIGN PATENT DOCUMENTS 0392671  10/1990  European Pat. Off. ....... H04N 7/137
0415491  3/1991   European Pat. Off. ....... G06F 15/70
0466981  1/1992   European Pat. Off. ....... H04N 5/14
0577417  1/1994   European Pat. Off. ....... H04N 7/1370
0609022  8/1994   European Pat. Off. ....... H04N 7/13

OTHER PUBLICATIONS

ICASSP-92, vol. 3, Mar. 23, 1992 pp. 545–548, XP00378989 P. Haskell et al. "Resynchronization Of Motion Compensated Video Affected By ATM Cell Loss".

*Primary Examiner*—Bryan Tung
*Attorney, Agent, or Firm*—Joseph S. Tripoli; Peter M. Emanuel; Frederick A. Wein

[57] ABSTRACT

A process for differential coding of a motion vector associated with a macro-block, including the steps: of determining the components of the said motion vector, of determining a prediction vector, each component of which is equal to the median value of the corresponding components of at least three candidate motion vectors, a candidate motion vector being a vector associated with a previously coded macro-block, and of subtracting the components thus obtained from the components of the vector to be coded. Implementation of the process is included.

12 Claims, 4 Drawing Sheets

DIFFERENTIAL CODING OF MOTION VECTORS USING THE MEDIAN OF CANDIDATE VECTORS

The present invention relates to a process for coding motion vectors in an image compression system. The invention applies especially, but not uniquely, to the coding of video images in respect of telecommunication channels rated at less than 64 kbit/s.

The invention also relates to a decoding process, to a coding device and to a decoding device.

An image compression device, or coder, is described for example in Recommendation H.261 of the Comit- Consultatif International T-l-graphique et T-l-phonique (CCITT), especially with reference to FIG. 3 ("source coder") of this document.

The device is based on the processing of the image in pixel blocks or macro-blocks. A block is composed of a matrix of eight times eight pixels, whereas a macroblock comprises four blocks. A macro-block can be coded in one of two modes termed "inter" or "intra", all the blocks making up the macro-block being coded in the same mode. In the case of "intra" coding, the blocks are subjected to a discrete cosine transformation, the coefficients thus obtained being quantized, and then coded in accordance with a variable-length code process ("VLC" coding). In the case of "inter" coding, it is the difference between the blocks and blocks of like position in a reference image which is subjected to the discrete cosine transformation.

To improve the performance of the coding in the "inter" mode, motion compensation processes are employed. A process of this type makes it possible to determine, in the reference image or a window thereof, a macro-block which will allow the effective "inter" coding of the macro-block to be coded of the current image. Various selection criteria exist for determining such a macro-block in the reference image. The relative position of the reference macro-block with respect to the position of the macro-block to be coded in the current image is determined by what is called a motion vector. This motion vector is transmitted in the header of the coded macro-block.

A decoder also possesses a memory containing the reference image. Knowing the motion vector and the coefficients corresponding to the coded macro-block, it will be able to restore the values of the pixels of the original macro-block. These values may contain errors, especially a quantization error.

The motion vectors are coded differentially with respect to a prediction vector. This vector is equal to the motion vector of the macro-block lying immediately to the left of the macro-block to be coded or decoded. The horizontal H and vertical V components of a vector are coded separately. According to a known process, the prediction vector is reinitialized to (0,0) in the following two cases:

if the macro-block immediately to the left of the macro-block to be coded or decoded was coded in "intra" mode, if the macro-block to be coded lies on the left edge of the image.

The subject of the invention is a process for the differential coding of a motion vector associated with a macro-block, characterized in that it comprises the steps:

of determining the components of the said motion vector, of determining a prediction vector, each component of which is equal to the median value of the corresponding components of at least three candidate motion vectors, a candidate motion vector being a vector associated with a previously coded macro-block, of subtracting the components thus obtained from the components of the vector to be coded.

According to a particular embodiment, the components of a candidate motion vector are regarded as being zero when determining the prediction vector if the macro-block associated with this candidate motion vector lies outside the image.

According to a particular embodiment, the components of a candidate motion vector are regarded as being zero when determining the prediction vector if the macro-block associated with this candidate motion vector was coded in "intra" mode.

According to a particular embodiment, the macro-blocks associated with the candidate motion vectors are macro-blocks adjacent to the macro-block of which a vector is to be coded.

According to a particular embodiment, the macro-blocks associated with the candidate motion vectors form part of the macro-blocks lying above or to the left of the macro-block of which a vector is to be coded.

According to a particular embodiment, the macro-blocks associated with the candidate motion vectors comprise the macro-block lying immediately to the left, the macro-block lying immediately above and the macro-block lying above and to the right of the macro-block of which a vector is to be coded.

The subject of the invention is also a process for the decoding of a motion vector coded by differential coding, characterized in that it comprises the steps:

of extracting the differences in components corresponding to this vector, of determining a prediction vector, each component of which is equal to the median value of the corresponding components of vectors associated with at least three previously decoded macro-blocks, of adding the said differences in components to the components of the prediction vector.

According to a particular embodiment, the components of a candidate motion vector are regarded as being zero when determining the prediction vector if the macro-block associated with this candidate motion vector lies outside the image.

According to a particular embodiment, the components of a candidate motion vector are regarded as being zero when determining the prediction vector if the macro-block associated with this candidate motion vector was coded in "intra" mode.

According to a particular embodiment, the macro-blocks associated with the candidate motion vectors are macro-blocks adjacent to the macro-block of which a vector is to be decoded.

According to a particular embodiment, the macro-blocks associated with the candidate motion vectors form part of the macro-blocks lying above or to the left of the macro-block of which a vector is to be decoded.

According to a particular embodiment, the macro-blocks associated with the candidate motion vectors comprise the macro-block lying immediately to the left, the macro-block lying immediately above and the macro-block lying above and to the right of the macro-block of which a vector is to be decoded.

The subject of the invention is also an image compression device including a motion estimation processor producing motion vectors, characterized in that, with the said vectors being coded with respect to a prediction vector, the said device comprises:

means for determining a prediction vector, each component of which is equal to the median value of the corresponding components of at least three candidate motion vectors, a candidate motion vector being a vector associated with a previously coded macro-block, means for subtracting the components thus obtained from the components of the vector to be coded, means for coding the values obtained through the said subtraction.

The subject of the invention is also a device for decompressing images compressed with the aid of a motion compensation process, characterized in that it comprises:

a buffer register receiving compressed data, demultiplexing means connected to the said register, dequantization means connected to the demultiplexing means, means of inverse transformation of demultiplexed and dequantized coefficients, means for extracting data relating to the motion vectors coded according to a differential coding with respect to a prediction vector, means for determining the prediction vector on the basis of the motion vectors corresponding to previously decoded macro-blocks.

According to a particular embodiment, the compression, respectively decompression device implements the coding, respectively decoding process.

The invention will be better understood through the description of a non-limiting preferred particular example illustrated by the figures among which:

FIG. 3 illustrates the processing of candidate vectors corresponding to macro-blocks lying beyond the boundaries of the image.

Figure 1:
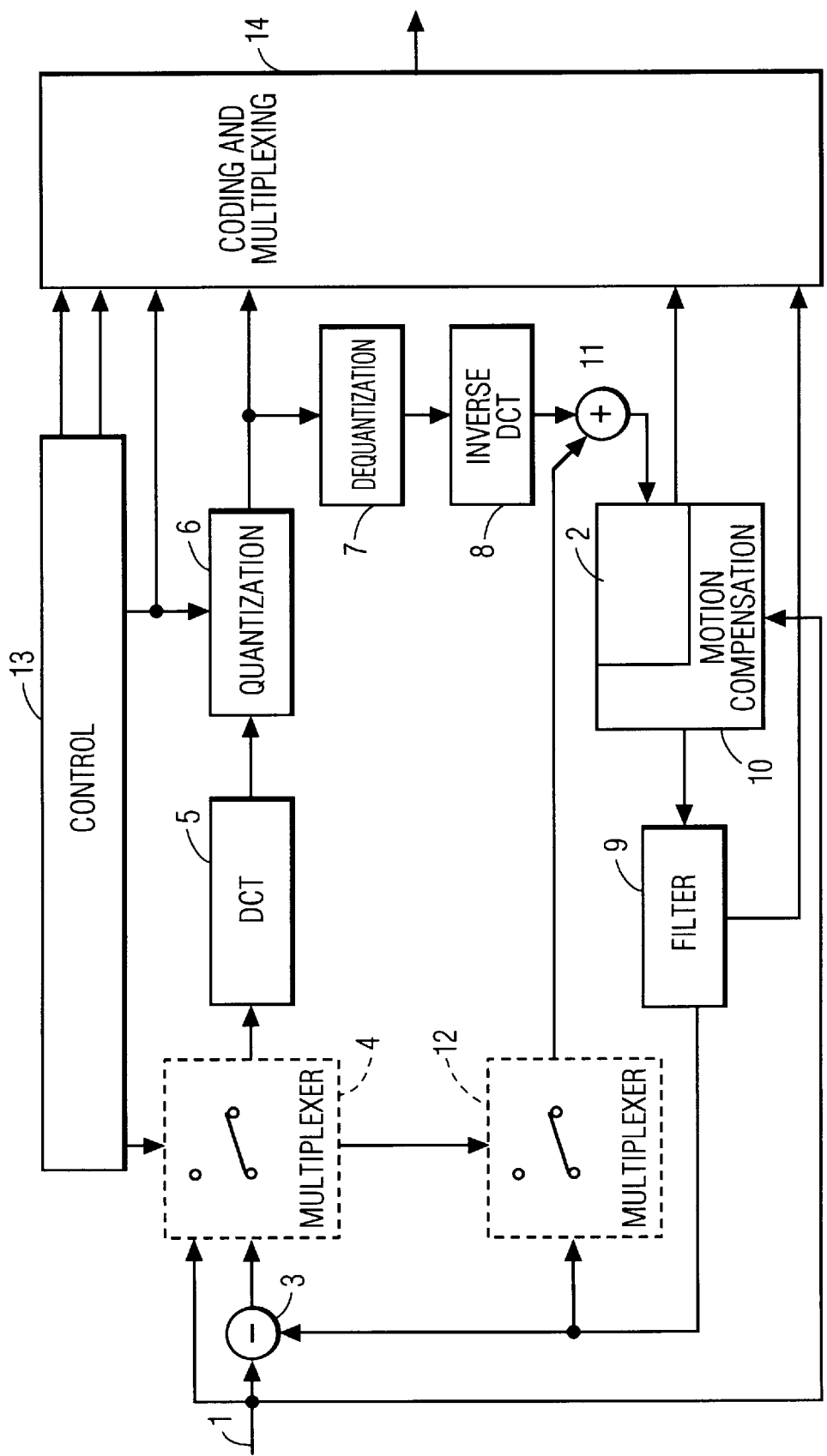
FIG. 1 is a functional diagram of an image coder implementing the invention.

A video image coder is represented in FIG. 1. This coder comprises a video input 1 feeding a motion compensation processor 10 (associated with a reference memory 2), a subtractor 3 and one of the inputs of a multiplexer 4 with two inputs. The second input of the multiplexer 4 is connected to the output of the subtractor 3. The output of the multiplexer 4 is linked to a discrete cosine transformation processor (DCT processor 5).

In "intra" mode, the subtractor is not used. The values of pixels are transmitted directly from the input 1 to the DCT processor 5.

In "inter" mode, it is the difference between the signal at the input of the device and a portion of the reference image stored in the memory 2 which is transmitted to the DCT processor 5.

The output of the DCT processor 5 is connected to a quantization circuit 6, the output of which is connected on the one hand to a dequantization circuit 7 followed by an inverse DCT processor 8, and on the other hand to a coding and multiplexing circuit 14. The coding circuit carries out, in particular, the VLC coding of the motion vector differences, the VLC coding of the DCT transform coefficients and the assembling of the various data in accordance with the structure required.

A block to be coded is subjected to the DCT transformation, whether it be an "inter" or "intra" block, that is to say one containing pixel values or differences in pixel values respectively. The DCT coefficients obtained are quantized and then coded in accordance with VLC coding. Such VLC codings, as well as the associated processes (block scan direction, coding of coefficient pairs and of lengths of strings of zero coefficients) will not be described in further detail since they are well known to those skilled in the art. The coded coefficients are inserted into the video multiplex in an appropriate manner.

The quantized coefficients are subjected to dequantization and then to inverse DCT transformation. This is the process to which these same data will be subjected in the decoder, the resulting pixel values containing the same errors, at least in part, notably the quantization errors. In the coder, these decoded data serve to update the reference image stored in the memory 2.

The output of the memory 2 is connected to an input of the subtractor 3, possibly across a spatial loop filter 9. The output of the inverse DCT processor 8 is connected to the reference memory 2 across a two-input adder 11. The second input of the adder 11 is connected to the output of a second multiplexer 12 with two inputs, one of which is connected to the output of the loop filter 9, and the other of which is not connected up, delivering zero pixel values. In "intra" mode, the output of the multiplexer 12 delivers the zero values. The two multiplexers 4 and 12 are controlled simultaneously by a control unit 13 which also handles the quantizing of the coefficients, notably as a function of the degree of fill of the video buffer register (not illustrated).

The motion compensation processor compares macro-blocks originating from the input 1 with macro-blocks of the reference image, and determines on the one hand whether a macro-block is to be coded in intra or inter mode. Such a decision can be made by evaluating the value of an error function as the sum of the squares of the pixel differences in the case of the "inter" mode with respect to threshold values.

The coding in "intra" mode is enforced from time to time if it is not chosen for a given number of images for one and the same macro-block. This is done in order to limit the accumulation of reconstruction errors within the inverse DCT transformation. For example, following recommendation H.261 mentioned earlier, such enforcement is carried out at least every 132 transmissions of one and the same block.

Motion compensation or estimation is employed in particular at the level of the processor 10. There are numerous processes for searching for the best motion vector and as many variants thereof: exhaustive comparison of blocks, hierarchical comparison processes etc. These processes can be implemented in particular by microprocessors, special-purposes processors etc.

According to the present example, the structure for sampling the luminance of an image is 144 lines of 176 pixels, this corresponding to a format of 11 times 9 macro-blocks. For the chrominance and for each of the colour components, the format is 72 lines of 88 pixels. This corresponds to a so-called 4:1:1 luminance chrominance structure.

This image format is also called the CIQF format (standing for Common Intermediate Quarter Format).

In this example it will be assumed that such an image format is available at the input 1 of the coder.

Hereafter, for the purposes of simplifying the explanations, only the luminance will be considered.

Figure 2:
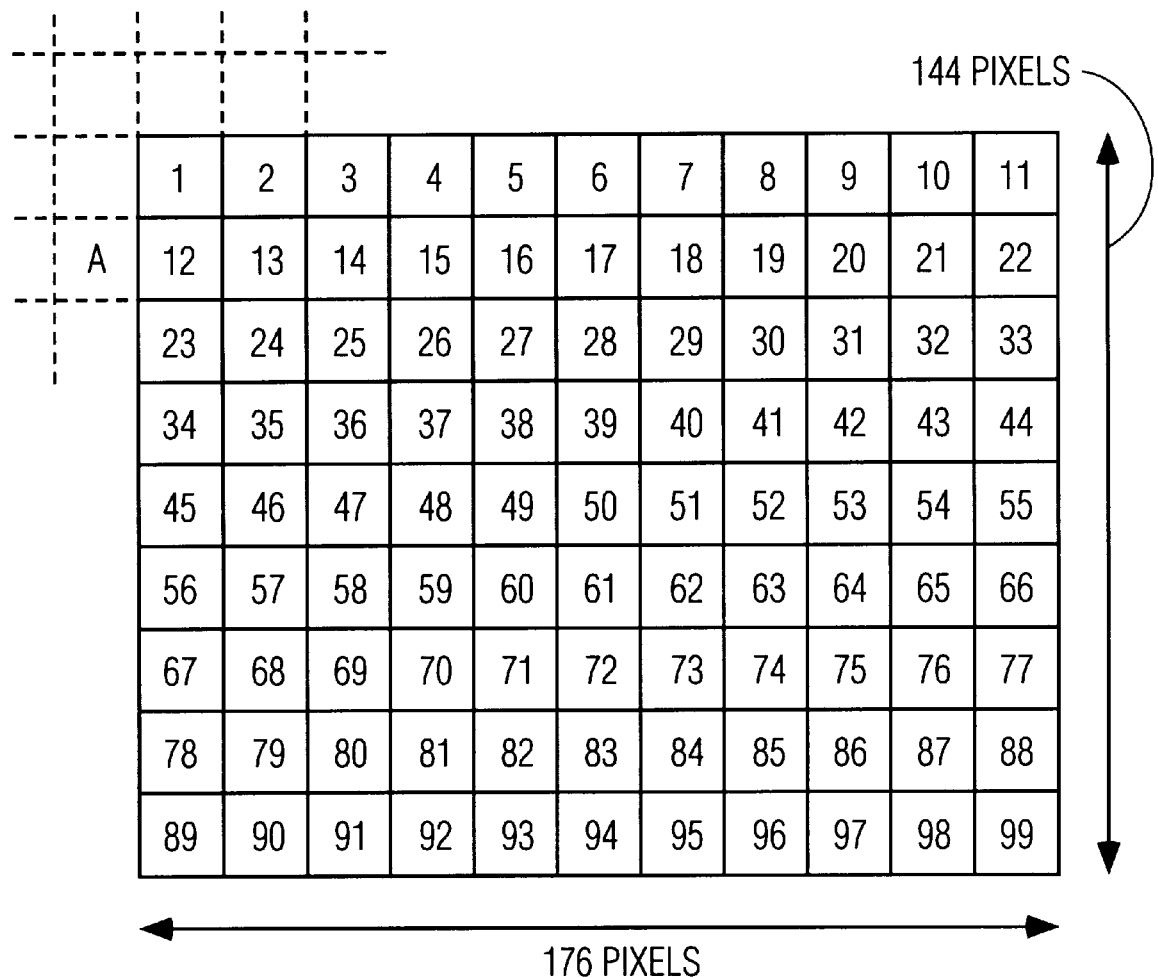
FIG. 2 represents the numbering of the macro-blocks of an image with the CIQF format.

FIG. 2 gives the numbering of the luminance macro-blocks. The actual macro-blocks of an image are surrounded by continuous lines. Hereafter, the eight macro-blocks which surround a current macro-block (that is to say the one currently being processed) will be referred to as adjacent macro-blocks. The macro-blocks adjacent to the macro-block 13 are the macro-blocks 1, 2, 3, 12, 14, 23, 24 and 25.

Again for the purposes of simplifying the explanations, the presence of dummy macro-blocks beyond the boundary of the image will be assumed. Macro-block A is a macro-block adjacent, to the macro-blocks 1, 12 and 23.

For each macro-block coded in "inter" mode, the processor 10 provides a pair of components of the motion vector associated with this block. In accordance with the present embodiment, the components have a precision of half a pixel and are confined to the interval [−16, +15.5).

According to the present embodiment, the circuit 14, which comprises for example a memory and a suitably programmed microprocessor, determines a prediction vector for each motion vector. The components Px and Py of this prediction vector are subtracted from the components of the motion vector to be coded.

According to the present embodiment, the components of the prediction vector are calculated in a manner made explicit by FIG. 3.

M0 denotes the current macro-block, that is to say the macro-block for which a prediction vector is being determined. On the other hand, MVix and MViy denote the first and second components respectively of the motion vector associated with macro-block i.

Figures 3A, 3B, 3C, 3D:
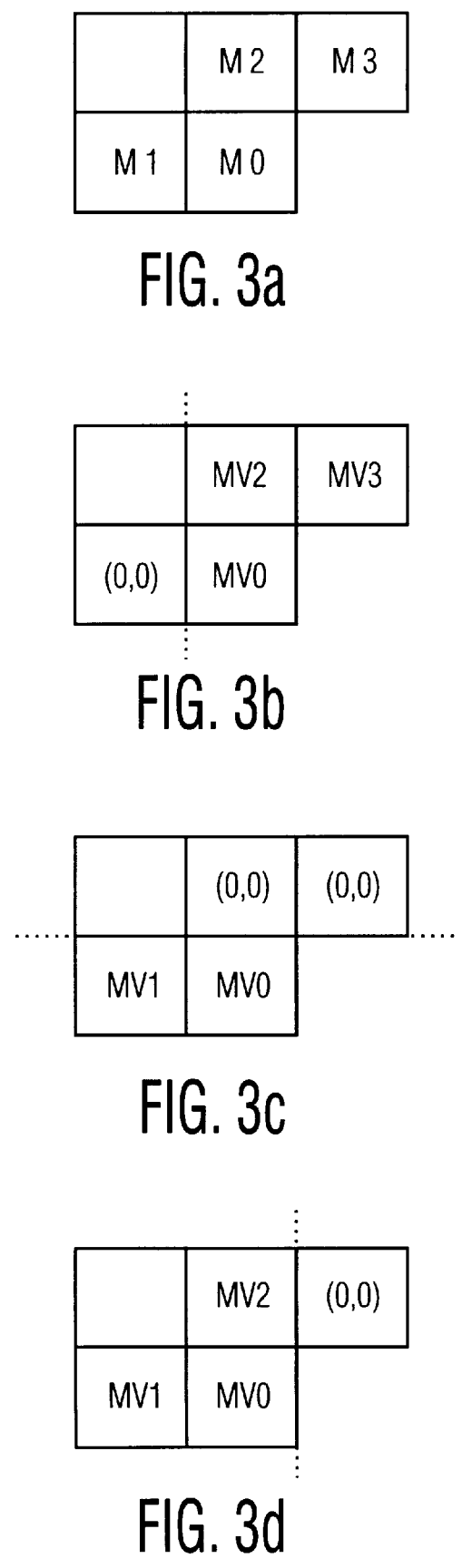

M1 denotes the macro-block immediately to the left of M0, M2 the macro-block immediately above M0, and M3 the macro-block above and to the left of M0. The motion vectors associated with the macro-blocks M1 to M3 are called candidate vectors and are denoted MV1 to MV3. FIG. 3a gives the arrangement of the macro-blocks M1 to M3 around M0.

Since a motion vector is defined only for macro-blocks coded in "inter" mode, the components of the candidate vectors are assumed to be zero in the following cases:

when a macro-block has been coded in "intra" mode, when a macro-block lies beyond the boundary of the image.

FIGS. 3b, 3c and 3d illustrate various cases. The pairs (0,0) indicate the macro-blocks for which the candidate vector is regarded as zero. The dotted line indicates the boundaries of the image.

Having determined the components of the three candidate vectors, the components of the prediction vector are calculated by choosing for each component of this vector the median value of the corresponding components of the candidate vectors. For example, if the candidate vectors are respectively:

MV1=(−2; 3), MV2=(1; 5), MV3=(−1; 7)

then the prediction vector will be (Px; Py)=(−1; 5).

We then form the difference between this prediction vector and the motion vector MV0:

MVDx=MVx-Px

MVDy=MVy-Py.

These differences are next coded by VLC coding and introduced into the video multiplex.

Given that the calculation of the prediction vector demands a knowledge of the vectors M1 to M3, these vectors are held in memory by the processor 10.

During decoding, a prediction vector is determined in a similar manner. Of course, addition of the components of this vector with the decoded differences will be carried out.

Figure 4:
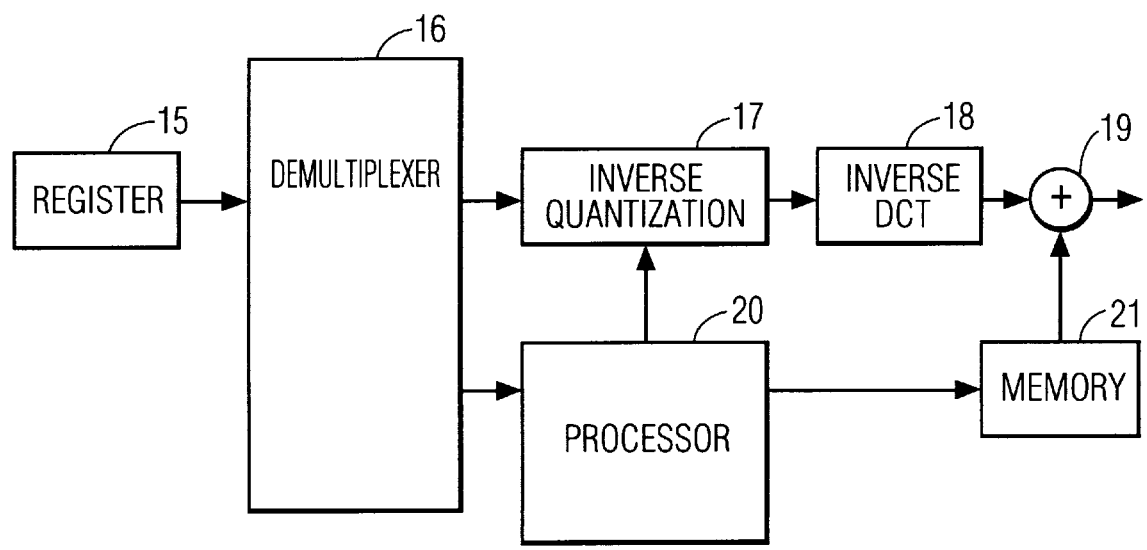
FIG. 4 is a functional diagram of a decoder implementing the process according to the invention.

FIG. 4 gives a functional diagram of a decoder. The data received from a reception and demodulation system are stored in a register 15. This register is required in order to match the speed of transmission of the data to their actual use. The data are demultiplexed by a demultiplexer 16. The coefficients are decoded, undergo inverse quantization (circuit 17), and then an inverse DCT transformation (circuit 18). The resulting blocks are added (by the adder 19) to the result of the prediction in the case of coding in "inter" mode. The prediction memory 21 is of course updated appropriately.

A processor 20 is tasked with controlling the quantization and in decoding the data corresponding to the motion vectors. It carries out the VLC decoding of the data, retains in memory the vectors required for the calculation of the prediction vector, determines this vector and then adds to the components thereof the decoded differences of components. The motion vectors thus re-established are used in a known manner.

According to an embodiment variant, motion vectors are associated with the macro-blocks coded in "intra" mode. This makes it possible to compensate for the transmission errors which could corrupt the coded coefficients of this macro-block. In this case, the corresponding candidate vectors are not regarded as being zero.

Obviously, the present invention is not limited to the embodiment example described, but applies to other compression systems using motion compensation.

I claim:

1. Process for the differential coding of a motion vector associated with a macro-block, comprising the steps:

of determining the components of the said motion vector, of determining a prediction vector, each component of which is equal to the median value of the corresponding components of three candidate motion vectors, the candidate motion vectors being the motion vectors associated with previously coded macro-blocks, these macroblocks being the macro-block lying immediately to the left, the macro-block lying above, the macro-block lying above to the right of the macro-block of which a vector is to be coded, and of subtracting the components thus obtained from the components of the vector to be coded.

2. Process according to claim 1, wherein the components of a candidate motion vector are regarded as being zero when determining the prediction vector if the macro-block associated with this candidate motion vector lies outside the image.

3. Process according to claim 1, wherein the components of a candidate motion vector are regarded as being zero when determining the prediction vector if the macro-block associated with this candidate motion vector was coded as being in an "intra" mode.

4. Process for the decoding of a motion vector coded by differential coding, comprising the steps:

of extracting the differences in components corresponding to this vector, of determining a prediction vector, each component of which is equal to the median value of the corresponding components of vectors associated with three previously decoded macro-blocks, these macro-blocks being the macro-block lying immediately to the left, the macro-block lying immediately above and the macro-block lying above and to the right of the macro-block of which a vector is to be coded, and of adding the differences in components to the components of the prediction vector.

5. Process according to claim 4, wherein the components of a candidate motion vector are regarded as being zero when determining the prediction vector if the macro-block associated with this candidate motion vector lies outside the image.

6. Process according to claim 4 wherein the components of a candidate motion vector are regarded as being zero when determining the prediction vector if the macro-block associated with this candidate motion vector was coded for being in an "intra" mode.

7. Image compression device including a motion estimation processor producing motion vectors comprising:

the motion vectors being coded with respect to a prediction vector, means for determining a prediction vector, each component of which is equal to the median value of the corresponding components of three candidate motion vectors, by these candidate motion vectors being the vectors associated with previously coded macro-blocks, these macro-blocks being the macro-block lying immediately to the left, the macro-block lying immediately above and the macro-block lying above and to the right of the macro-block of which a vector is to be decoded, means for subtracting the components thus obtained from the components of the vector to be coded, and means for coding the values obtained through the subtraction.

8. Device for decompressing images compressed with the aid of a motion compensation process, comprising:

a buffer register receiving compressed data, demultiplexing means connected to the buffer, dequantization means connected to the demultiplexing means, means for inverse transformation of demultiplexed and dequantized coefficients, means for extracting data relating to the motion vectors, coded according to a differential coding with respect to a prediction vector, and means for determining the prediction vector on the basis of the motion vectors corresponding to previously decoded macro-blocks, these macro-blocks being the macro-block lying immediately to the left, the macro-block lying immediately above and the macro-block lying above and to the right of the macro-block of which a vector is to be decoded.

9. A process for determining a prediction vector for a motion vector of a current macroblock of a picture wherein each component of the prediction vector is equal to the median value of the corresponding components of three candidate motion vectors, the candidate motion vectors being the vectors associated with previously coded macroblocks, these macroblocks being the macroblock lying immediately to the left the macroblock lying immediately above and the macroblock lying above to the right of the current macroblock.

10. The process according to claim 9 wherein the components of a candidate motion vector are regarded as being zero when determining the prediction vector if the macro-block associated with the candidate motion vector lies outside the image.

11. The process according to claim 9, wherein the components of a prediction vector are regarded as being zero when determining the candidate prediction vector if the macro-block associated with this candidate motion vector was coded in an intra mode.

12. An image compression device including a motion estimation processor producing motion vectors, the device comprising:

means for determining a prediction vector for a motion vector of a current macroblock of a picture, each component of the prediction vector being equal to the median value of the corresponding components of three candidate motion vectors, the candidate motion vectors being the vectors associated with previously coded macro-blocks, these macroblocks being the macro-block lying immediately to the left the macro-block lying immediately above and the macro-block lying above to the right of the current macro-block.

* * * * *